(12) United States Patent
Chakraborty et al.

(10) Patent No.: US 12,229,542 B2
(45) Date of Patent: Feb. 18, 2025

(54) DYNAMIC VIRTUAL NETWORK ACCESS

(71) Applicant: INTERNATIONAL BUSINESS MACHINES CORPORATION, Armonk, NY (US)

(72) Inventors: Aditi Chakraborty, Bangalore (IN); Raghuveer Prasad Nagar, Kota (IN); Sweta Agarwal, Birpara (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 17/451,073

(22) Filed: Oct. 15, 2021

(65) Prior Publication Data

US 2023/0121238 A1 Apr. 20, 2023

(51) Int. Cl.
*G06F 8/61* (2018.01)
*G06F 8/65* (2018.01)
*G06F 8/70* (2018.01)
*G06F 11/30* (2006.01)
*G06F 11/36* (2006.01)

(52) U.S. Cl.
CPC ............... *G06F 8/63* (2013.01); *G06F 8/65* (2013.01); *G06F 8/70* (2013.01); *G06F 11/3006* (2013.01); *G06F 11/3055* (2013.01); *G06F 11/3604* (2013.01)

(58) Field of Classification Search
None
See application file for complete search history.

(56) References Cited

U.S. PATENT DOCUMENTS 8,850,516 B1 * 9/2014 Hrebicek ............ G06F 21/6218
  707/610
8,959,579 B2 2/2015 Barton
  (Continued)

FOREIGN PATENT DOCUMENTS

CN 104239164 A 12/2014
CN 104903910 B 3/2018

OTHER PUBLICATIONS

Anonymous; A new architecture in hybrid cloud to secure authorized business content; ip.com; IPCOM000242936D; Sep. 1, 2015; 10 pages.

(Continued)

*Primary Examiner* — Lewis A Bullock, Jr.
*Assistant Examiner* — Mark A Gooray
(74) *Attorney, Agent, or Firm* — Schmeiser, Olsen & Watts, LLP; Edward Wixted (57) ABSTRACT

A system, method, and computer program product for implementing dynamic virtual network access is provided. The method includes monitoring hardware devices associated with network locations comprising data and software code. In response, updates applied to the data and software code are detected and a context of the updates is determined. Based on the context, it is determined that that the updates applied to the data and software code should be cloned and associated user access is verified. A target component location associated with the updates applied to the data and software code to be cloned is determined and the updates applied to the data and software code with respect to the target component location are cloned. A notification indicating the cloning is transmitted to users.

17 Claims, 6 Drawing Sheets

(56) References Cited

U.S. PATENT DOCUMENTS

| | | | |
|---|---|---|---|
| 9,602,474 B2 | 3/2017 | Barton | |
| 9,858,428 B2 | 1/2018 | Barton | |
| 10,523,592 B2* | 12/2019 | Byers | H04L 47/823 |
| 2012/0265803 A1 | 10/2012 | Ha | |
| 2014/0089279 A1 | 3/2014 | Gibson | |
| 2014/0108793 A1 | 4/2014 | Barton | |
| 2014/0108794 A1 | 4/2014 | Barton | |
| 2014/0122508 A1 | 5/2014 | Eigner | |
| 2014/0143543 A1 | 5/2014 | Aikas | |
| 2015/0007296 A1 | 1/2015 | Auger | |
| 2015/0143120 A1 | 5/2015 | Barton | |
| 2017/0048204 A9 | 2/2017 | Barton | |
| 2017/0147825 A1 | 5/2017 | Barton | |
| 2017/0185627 A1* | 6/2017 | Reynolds | G06F 8/65 |
| 2018/0337929 A1 | 11/2018 | Kurian | |
| 2020/0079370 A1* | 3/2020 | Swope | G06T 7/596 |
| 2020/0320219 A1 | 10/2020 | Barouch | |
| 2021/0271692 A1* | 9/2021 | Kumar | G06F 11/2058 |
| 2021/0279050 A1* | 9/2021 | Chen | G06F 8/71 |
| 2021/0397438 A1* | 12/2021 | Sirov | H04L 12/2834 |
| 2022/0398188 A1* | 12/2022 | Leasck | G06F 9/451 |

OTHER PUBLICATIONS

Anonymous; Method for Protecting Business Internal Contents in Public, Personal, and Company Storage Space; IP.com; IPCOM000240922D; Mar. 12, 2015; 4 pages.

Mell, Peter et al.; "The NIST Definition of Cloud Computing;" National Institute of Standards and Technology; Special Publication 800-145; Sep. 2011; 7 pages.

* cited by examiner

DYNAMIC VIRTUAL NETWORK ACCESS

BACKGROUND

The present invention relates generally to a method for enabling virtual network access and in particular to a method and associated system for improving network software technology associated with monitoring hardware devices for updates applied to data and software code and cloning the updates applied to the data and software code with respect to a target component location.

SUMMARY

A first aspect of the invention provides network server device comprising a processor coupled to a computer-readable memory unit, the memory unit comprising instructions that when executed by the processor implements a dynamic virtual network access method comprising: monitoring, by the processor, hardware devices associated with network locations comprising data and software code; detecting, by the processor based on results of the monitoring, updates applied to the data and software code; determining, by the processor based on results of the detecting, a context of the updates; determining, by the processor based on the context, that the updates applied to the data and software code should be cloned; determining, by the processor based on the context, users requiring access to the updates applied to the data and software code to be cloned; determining, by the processor, a target component location associated with the updates applied to the data and software code to be cloned; cloning, by the processor, the updates applied to the data and software code with respect to the target component location; and transmitting, by the processor to the users, a notification indicating the cloning.

A second aspect of the invention provides a dynamic virtual network access method comprising: monitoring, by a processor of a network server device, hardware devices associated with network locations comprising data and software code; detecting, by the processor based on results of the monitoring, updates applied to the data and software code; determining, by the processor based on results of the detecting, a context of the updates; determining, by the processor based on the context, that the updates applied to the data and software code should be cloned; determining, by the processor based on the context, users requiring access to the updates applied to the data and software code to be cloned; determining, by the processor, a target component location associated with the updates applied to the data and software code to be cloned; cloning, by the processor, the updates applied to the data and software code with respect to the target component location; and transmitting, by the processor to the users, a notification indicating the cloning.

A third aspect of the invention provides a computer program product, comprising a computer readable hardware storage device storing a computer readable program code, the computer readable program code comprising an algorithm that when executed by a processor of a network server device implements a dynamic virtual network access method, the method comprising: monitoring, by the processor, hardware devices associated with network locations comprising data and software code; detecting, by the processor based on results of the monitoring, updates applied to the data and software code; determining, by the processor based on results of the detecting, a context of the updates; determining, by the processor based on the context, that the updates applied to the data and software code should be cloned; determining, by the processor based on the context, users requiring access to the updates applied to the data and software code to be cloned; determining, by the processor, a target component location associated with the updates applied to the data and software code to be cloned; cloning, by the processor, the updates applied to the data and software code with respect to the target component location; and transmitting, by the processor to the users, a notification indicating the cloning.

The present invention advantageously provides a simple method and associated system capable of automating virtual network access.

DETAILED DESCRIPTION

Figure 1:
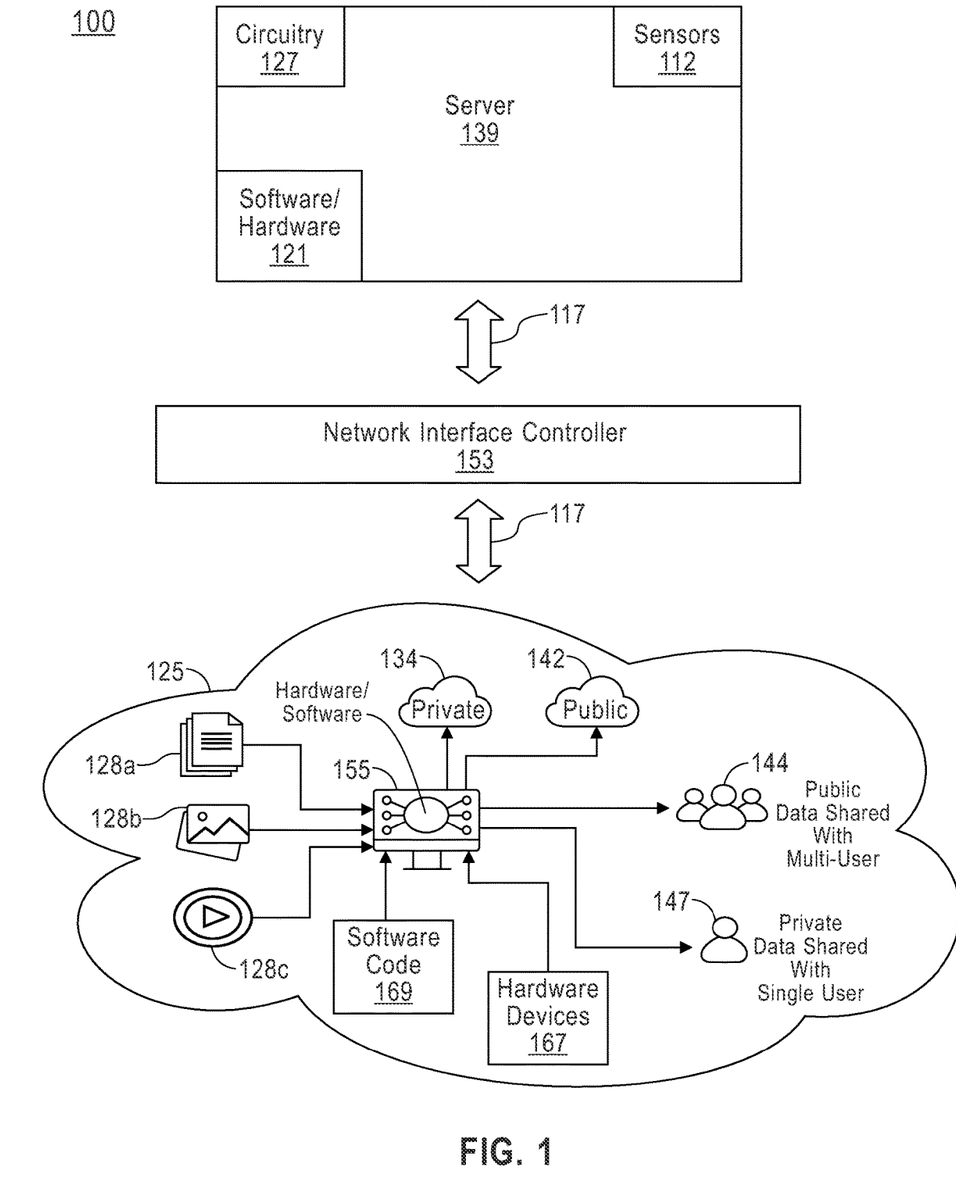
FIG. 1 illustrates a system for improving network software technology associated with monitoring hardware devices for updates applied to data and software code and cloning the updates applied to the data and software code with respect to a target component location, in accordance with embodiments of the present invention.

System FIG. 1 illustrates a system 100 for improving network software technology associated with monitoring hardware devices for updates applied to data 128a . . . 128c and software code 169 and cloning the updates applied to the data 128a . . . 128c and software code 169 with respect to a target component location, in accordance with embodiments of the present invention. Virtual systems are typically not configured to provide continuous remote access to a system (e.g., via a laptop or mobile device). Likewise, enabling remote system access to a trusted source system may increase a chance for sensitive data mishandling. Additionally, a remote system crash or a process for configuring a new device with a similar configuration may cause system issues for users. The aforementioned issues may cause a need for:

1. Access to a device when a physical device is not accessible.
2. Enabling users to access devices (and restricting access to specified applications) of others without causing a security breach.

3. Configuring a new device with a same configurations as a previous device.
4. Preventing a loss of data due to device malfunction or theft of the device.

Therefore, system 100 comprises an artificial intelligence (AI) and Internet of Things (IoT) based system configured to contextually enable requirements for remote device access (from other devices or by other users). Accordingly, associated data and software may be cloned within a cloud for access from a predicted location(s) of access. Subsequently, system 100 is configured to enable password-based-authorization of cloned content (i.e., data and software) using content classification processes.

System 100 enables the following functionality associated with dynamic AI based cloud access:
1. Enabling AI and IoT hardware and software for predicting data and software code access (via hardware devices) location(s) and cloning data and software code within a cloud accessible from the predicted access location(s). The data and software code access location(s) may be predicted with respect to, inter alia: content of a work/document associated with the data and software code, an organization policy associated with the data and software code, a calendar of a user associated with the data and software code, an operational state of a hardware device associated with the data and software code, usage of a document associated with the data and software code, IoT data associated with the data and software code, etc.
2. Detecting relevant users/contacts associated with sharing cloned data and software code.
3. Predicting specified portions (of a document or code having multiple portions) to be accessed for executing a cloning process with respect to specified clouds associated with a cloud optimization process.
4. Identifying a last updated document or code (that may be edited/downloaded multiple times) first based on a file name (of the file or code that has been edited/downloaded) and preventing cloned duplicate documents/code from being stored on a cloud network.
5. Detecting if content (e.g., an entire document/code or subsections) are private, public, or restricted (e.g., restricted to a user group) during a cloning process.

System 100 of FIG. 1 includes a server 139 and a network system (e.g., a cloud/virtual network) 125 interconnected through a network 117. Server 139 comprises sensors 112, circuitry 127, and software/hardware 121. Network system 125 comprises hardware/software 155 connected to hardware devices 167 and software code 169 for retrieving data/files/computer code comprising, inter alia, text documents 128a, images 128b, video files 128c, etc. Hardware/software 155 is configured to clone data and code with respect to an associated storage location such as an on-premises/on-device storage system or cloud storage over a private cloud 134 system or a public cloud system 142. Hardware/software 155 is further configured to provide access of cloned data/code to multiple users 144 private data/code only with required users 147. Server 139 and network system 125 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139 and network system 125 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving network software technology associated with monitoring hardware devices for updates applied to data and software code and cloning the updates applied to the data and software code with respect to a target component location. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 117 may include any type of network including, inter alia, a local area network, (LAN), a wide area network (WAN), the Internet, a wireless network, etc.

System 100 is configured to enable following process:

The process is initiated when a user registers (with a system such as system 100) for a service. A user may include: a single user, a group of users, an organization, etc. Additionally, a user may register with multiple cloud accounts/software, user devices (e.g., a laptop computer, a personal digital assistant, a mobile device, etc.), folders and applications associated with monitoring functionality, etc. Subsequently, the system monitors devices (e.g., hardware devices 167), device operational activities, and user data and associated software code to determine local data and code (e.g., premise or cloud) should be cloned via a cloud process. The system may execute the aforementioned monitoring process with respect to:
1. Executing natural language processing (NLP) code with respect to textual content and image processing code with respect to visual content such as like images. If visual content comprises textual content optical character recognition (OCR) code is executed with respect to the visual content comprising textual content.
2. Executing NLP classification code for classifying content/document into classes such as local data (i.e., data not required to be cloned), cloud data (i.e., data that may be cloned with respect to a cloud), and assigned cloud data (i.e., data that may be cloned only to a cloud recommended by an entity).
3. Executing speech-to-text conversion and NLP code to verify communications and unstructured information within a digital calendar (e.g., a location mentioned as a string).
4. Executing user interface (UI) analytics via usage of software code to detect an operational status of hardware devices.
5. Executing speech-to-text conversion and NLP code to IoT Data (e.g., from mobile devices, personal assistants, voice assistance systems, etc.).

Subsequently, documents, document-content, and software applications are identified as personal or company confidential using AI based identification techniques (e.g., NLP based classification). Data identified as personal data may be stored within a public cloud of a user. Data identified as company confidential data may be stored within a company cloud. A company cloud may be enabled with respect to company policies and may determine and differentiate data for download and transfer from the company cloud via a company secured laptop, etc. Local (hardware/software) storage devices may be scanned for selecting documents and content/code to copy/move over to a cloud. For example, a replica of selected files and content/code may be created within a cloud structure such that data may be stored within different cloud databases based on data content. Likewise, duplicate data/code may be identified (e.g., multiple copies of a same file name stored within different locations based on a file name) and cloned. Downloaded files that are not modified are not cloned to the cloud. Copied files and content/code may be classified further (e.g., official-confidential, official-public, etc.). Additionally, users may access company confidential data from a temporary or new device connected to a company virtual private network (VPN). System 100 may further execute speech-to-text conversion and NLP based semantic analysis code for identifying a conversation process form identifying users for receiving content uploaded to the cloud. The following examples illustrate implementation of the aforementioned process:

As a first example, users (Mark, George, Alex, and James) attend a meeting to discuss an idea and Mark takes notes of a discussion taking place. In response, a system (e.g., system 100) automatically identifies that a document comprising notes of the meeting discussion and determines that the notes must be shared with Alex, George and James. Therefore, the system automatically uploads the document to cloud storage and shares an associated link (with edit permissions) via mail to Alex, George, James, and Mark.

As a second example, a user (Peter) initiates a request to a user (Rob) for obtaining a mobile passcode for viewing specified photos (e.g., from a party). In response, an automated request for the passcode is received via a voice assistance system (of a hardware device). Subsequently, when Rob states "okay, Peter", the hardware device automatically clones the photos to Peter's photo software and Peter is enabled to access his photo software and views the specified photos.

As a third example, uses (Mary and Susan) are working together (via Mary's laptop) on an important client presentation during working hours. Subsequently (the next day), all employees are asked to work from home and management requests that the presentation be presented (by Mary) via a virtual meeting. During initiation of the virtual meeting, Mary determines that she is unable to communicate with the virtual meeting due to a network issue. In response, system 100 automatically detects the issue and uploads the presentation to a private cloud, categorizing the presentation as client confidential data and shares a link via mail of the uploaded file (with edit permissions) with Mary and Susan. Likewise, the uploaded presentation is also shared with a client (i.e., with only view permission). During the presentation, Susan uses the link for the presentation for delivery.

Figure 2:
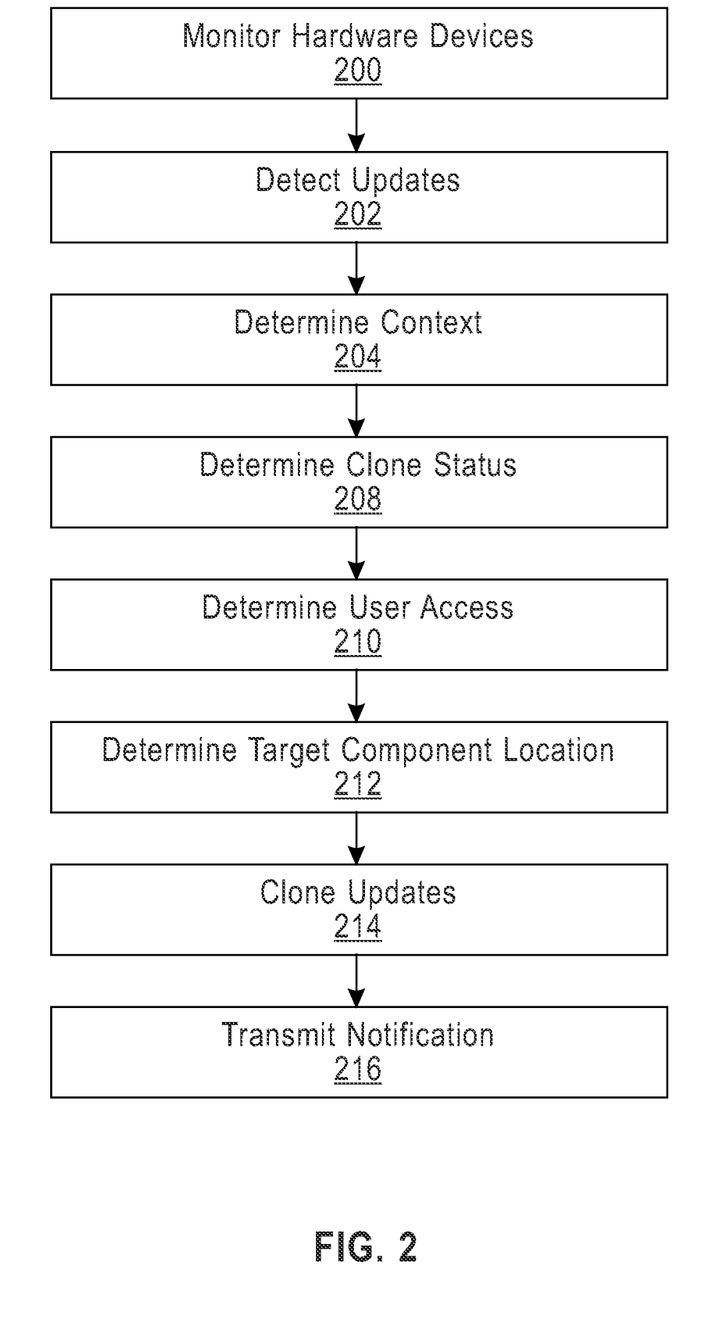
FIG. 2 illustrates an algorithm detailing a process flow enabled by the system of FIG. 1 for improving network software technology associated with monitoring hardware devices for updates applied to data and software code and cloning the updates applied to the data and software code with respect to a target component location, in accordance with embodiments of the present invention.

FIG. 2 illustrates an algorithm detailing a process flow enabled by system 100 of FIG. 1 for improving network software technology associated with monitoring hardware devices for updates applied to data and software code and cloning the updates applied to the data and software code with respect to a target component location, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 139 and network system 125 of FIG. 1. In step 200, hardware devices associated with network locations (comprising data and software code) are monitored by a network server device. Monitoring the hardware devices may include detecting an operational state of the hardware devices.

In step 202, updates applied to the data and software code are detected based on results of step 200. The updates may include enabling a process for replacing portions of the data and software code with new portions of additional data and software code. Alternatively, the updates may include enabling a process for adding new portions of additional data and software code to the data and software code. Detecting the updates may be executed based on: a size of the data and software code, a timestamp associated with the data and software code, a number of files associated with the data and software code, etc.

In step 204, a context of the updates is determined based on results of step 202. Determining the context of the updates may be executed based on content associated with the data and software code, a location or directory associated with the data and software code, network communication attributes associated with the data and software code, etc.

In step 208, it is determined (based on the context) that the updates applied to the data and software code should be cloned. In step 210, users requiring access to the updates applied to the data and software code to be cloned are determined. In step 212, a target component location associated with the updates applied to the data and software code to be cloned is determined. Determining the target component location may be executed based on network security and communication attributes associated with the network locations.

In step 214, the updates applied to the data and software code are cloned with respect to the target component location. The updates applied to the data and software code for cloning may be prepared by enabling a subset of the data and software code for the cloning based on determining the users requiring access to the updates. The cloning process may be executed at a specified time period in accordance with policies of the network locations. In step 216, a notification indicating the cloning is transmitted to users.

Figure 3:
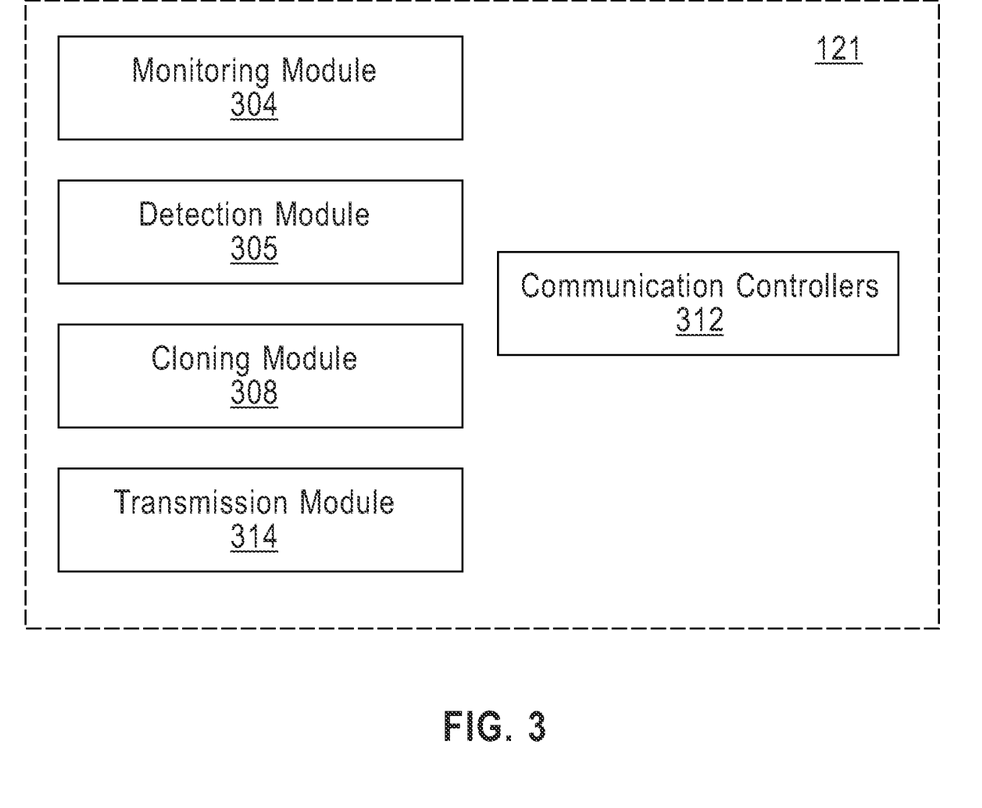
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes a monitoring module 304, a detection module 305, a cloning module 308, a transmission module 314, and communication controllers 312. Monitoring module 304 comprises specialized hardware and software for controlling all functionality related to the monitoring steps described with respect to the algorithm of FIG. 2. Detection module 305 comprises specialized hardware and software for controlling all functions related to the detecting steps of FIG. 2. Cloning module 308 comprises specialized hardware and software for controlling all functions related to the cloning steps of FIG. 2. Transmission module 314 comprises specialized hardware and software for controlling all functions related to the transmitting steps of the algorithm of FIG. 2. Communication controllers 312 are enabled for controlling all communications between monitoring module 304, detection module 305, cloning module 308, and transmission module 314.

Figure 4:
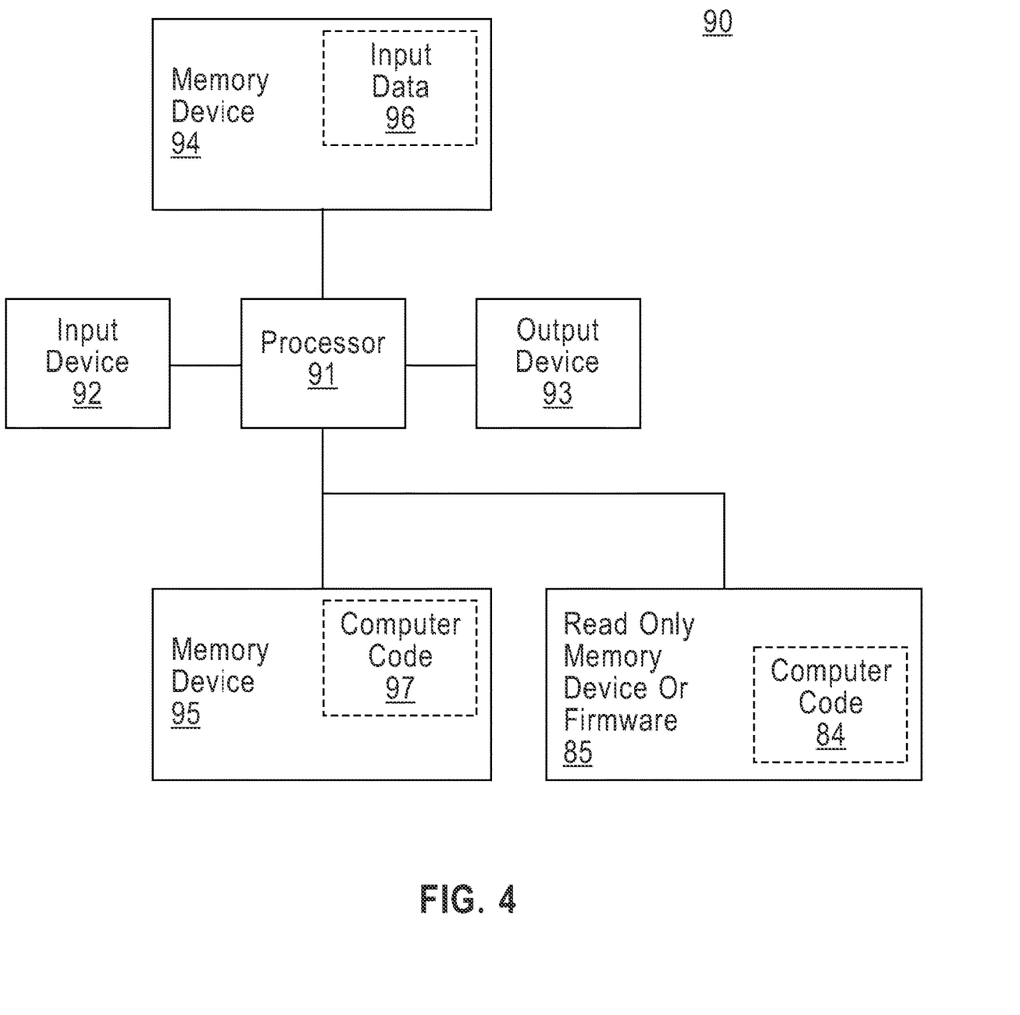
FIG. 4 illustrates a computer system used by the system of FIG. 1 for improving network software technology associated with monitoring hardware devices for updates applied to data and software code and cloning the updates applied to the data and software code with respect to a target component location, in accordance with embodiments of the present invention.

FIG. 4 illustrates a computer system 90 (e.g., server 139 and network system 125 of FIG. 1) used by or comprised by the system 100 of FIG. 1 for improving network software technology associated with monitoring hardware devices for updates applied to data and software code and cloning the updates applied to the data and software code with respect to a target component location, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving network software technology associated with monitoring hardware devices for updates applied to data and software code and cloning the updates applied to the data and software code with respect to a target component location. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network software technology associated with monitoring hardware devices for updates applied to data and software code and cloning the updates applied to the data and software code with respect to a target component location. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network software technology associated with monitoring hardware devices for updates applied to data and software code and cloning the updates applied to the data and software code with respect to a target component location. In another embodiment, the invention provides a business method that performs the process steps of the invention on a subscription, advertising, and/or fee basis. That is, a service supplier, such as a Solution Integrator, could offer to enable a process for improving network software technology associated with monitoring hardware devices for updates applied to data and software code and cloning the updates applied to the data and software code with respect to a target component location. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
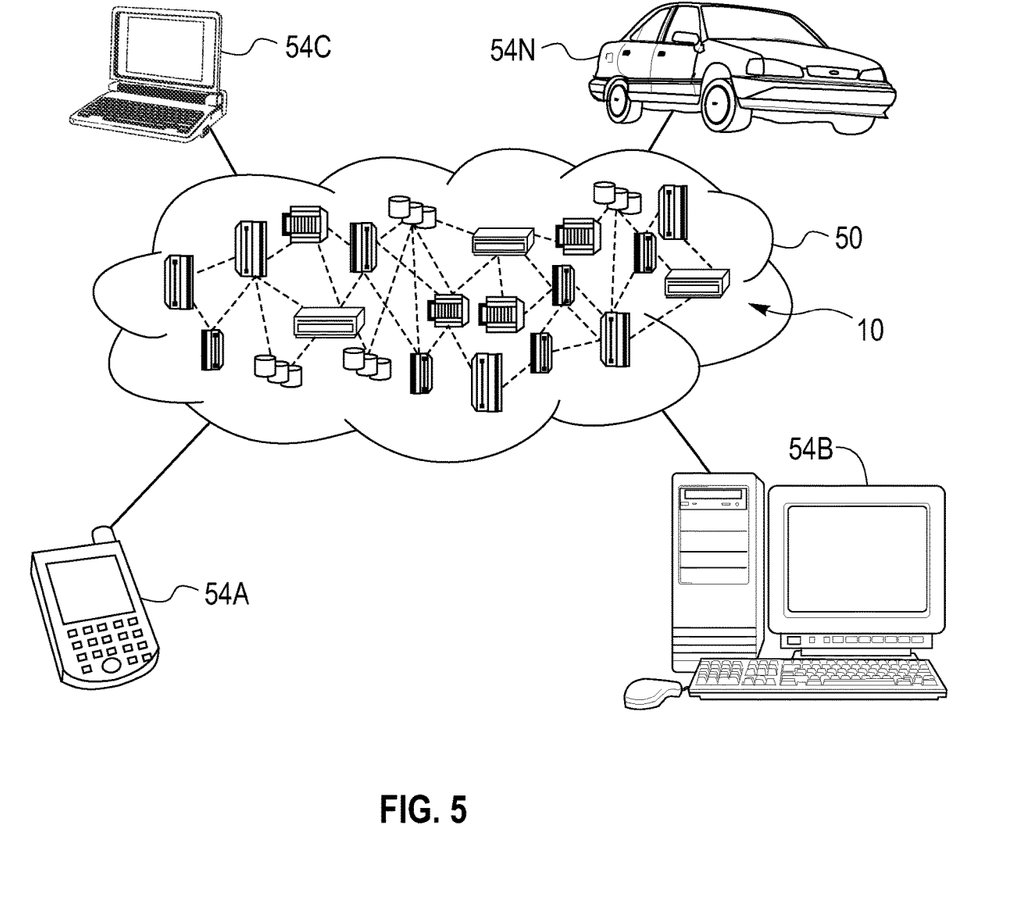
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 6:
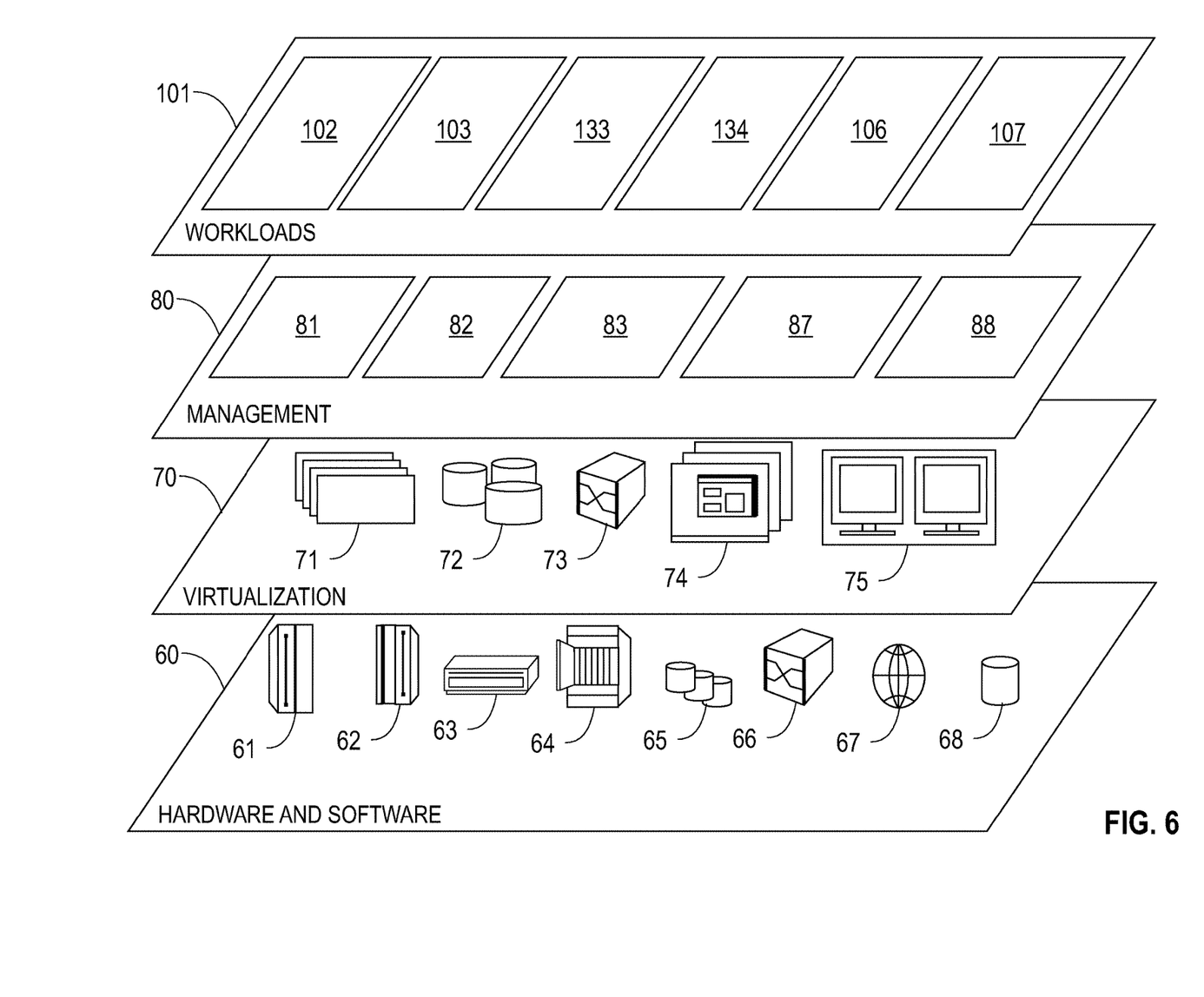
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network software technology associated with monitoring hardware devices for updates applied to data and software code and cloning the updates applied to the data and software code with respect to a target component location 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network server device comprising one or more processors coupled to a computer-readable memory unit, the memory unit comprising instructions that when executed by the one or more processors implement a dynamic virtual network access method, said method comprising:
monitoring, by said one or more processors, hardware devices associated with network locations, said monitoring comprising detecting, via execution of a first software code, an operational state of the hardware devices;
detecting, by said one or more processors based on results of said monitoring, updates to a second software code for retrieving data, wherein said detecting updates to said second software code includes determining satisfaction of criteria pertaining to a size of said software code, a timestamp associated with said software code, and a number of files associated with said second software code;
determining, by said one or more processors based on results of said detecting, a context of said updates, said determining the context further based on content associated with data and the second software code, a location or directory associated with the data and the second software code, and network communication attributes associated with the data and the second software code;
determining, by said one or more processors based on said context, that said updates should be cloned and the cloned updates should be applied to said second software code;
determining, by said one or more processors based on said context, users requiring access to said updates;
determining, by said one or more processors, a target component location associated with said updates, said determining the target location based on network security and communication attributes associated with the network locations;
cloning, by said one or more processors via execution of said first software code, said updates to said second software code within a cloud for access and applying said cloned updates to said second software code with respect to said target component location to generate an updated second software code; and
transmitting, by said one or more processors to said users, a notification indicating said cloning.

2. The network server device of claim 1, wherein said updates comprise replacing portions of said second software code with new portions of software code or adding said new portions of software code to said second software code.

3. The network server device of claim 1, said method further comprising:
enabling, by said one or more processors, a subset of said second software code for said cloning based on said determining said users requiring access to said updates.

4. The network server device of claim 1, wherein said cloning is executed at a specified time period in accordance with policies of said network locations.

5. The network server device of claim 1, said method further comprising:
enabling, by said one or more processors, password-based-authorization of the cloned updates to said second software code using content classification processes.

6. The network server device of claim 1, said method further comprising:
detecting, by said one or more processors, relevant users associated with sharing said cloned updates to said second software code.

7. The network server device of claim 1, said method further comprising:
predicting, by said one or more processors, specified portions of said second software code having multiple portions; and accessing, by said one or more processors, said specified portions for executing a cloning process with respect to specified clouds associated with a cloud optimization process.

8. The network server device of claim 1, said method further comprising:
detecting, by said one or more processors, whether the second software code is private, public, or restricted during said cloning.

9. The network server device of claim 1, wherein the target component location is a predicted location of access, said method further comprising:
predicting, by said one or more processors, said location of access with respect to content of a work/document associated with the second software code, an operational state of a hardware device associated with the second software code, and usage of a document associated with the second software code.

10. The network server device of claim 9, said method further comprising:
enabling, by said one or more processors, artificial intelligence (AI) and Internet of Things (IoT) hardware and software for a predicted location of access of said cloned second software code within the cloud accessible from said predicted location of access.

11. The network server device of claim 1, wherein the target component location is a predicted location of access, said method further comprising:
predicting, by said one or more processors, said location of access with respect to content of a work/document associated with the second software code, an organization policy associated with the second software code, a calendar of a user associated with the second software code, an operational state of a hardware device associated with the second software code, and usage of a document associated with the second software code, Internet of Things (IoT) data associated with the second software code.

12. The network server device of claim 1, said method comprising:
identifying, by said one or more processors, multiple duplicate copies of said cloned updates stored within different locations and in response, preventing, by said one or more processors, said multiple duplicate copies of said cloned updates from being stored on a cloud network.

13. A dynamic virtual network access method, said method comprising:
monitoring, by said one or more processors, hardware devices associated with network locations, said monitoring comprising detecting, via execution of a first software code, an operational state of the hardware devices;

detecting, by said one or more processors based on results of said monitoring, updates to a second software code for retrieving data, wherein said detecting updates to said second software code includes determining satisfaction of criteria pertaining to a size of said software code, a timestamp associated with said software code, and a number of files associated with said second software code;

determining, by said one or more processors based on results of said detecting, a context of said updates, said determining the context further based on content associated with data and the second software code, a location or directory associated with the data and the second software code, and network communication attributes associated with the data and the second software code;

determining, by said one or more processors based on said context, that said updates should be cloned and the cloned updates should be applied to said second software code;

determining, by said one or more processors based on said context, users requiring access to said updates;

determining, by said one or more processors, a target component location associated with said updates, said determining the target location based on network security and communication attributes associated with the network locations;

cloning, by said one or more processors via execution of said first software code, said updates to said second software code within a cloud for access and applying said cloned updates to said second software code with respect to said target component location to generate an updated second software code; and transmitting, by said one or more processors to said users, a notification indicating said cloning.

14. The method of claim 13, wherein said updates comprise replacing portions of said second software code with new portions of software code or adding said new portions of software code to said second software code.

15. The method of claim 13, said method further comprising:

enabling, by said one or more processors, a subset of said second software code for said cloning based on said determining said users requiring access to said updates.

16. The method of claim 13, wherein said cloning is executed at a specified time period in accordance with policies of said network locations.

17. A computer program product, comprising a computer readable medium storing a computer readable program code, said computer readable program code comprising an algorithm that when executed by one or more processors of a network server device implements a dynamic virtual network access method, said method comprising:

monitoring, by said one or more processors, hardware devices associated with network locations, said monitoring comprising detecting, via execution of a first software code, an operational state of the hardware devices;

detecting, by said one or more processors based on results of said monitoring, updates to a second software code for retrieving data, wherein said detecting updates to said second software code includes determining satisfaction of criteria pertaining to a size of said software code, a timestamp associated with said software code, and a number of files associated with said second software code;

determining, by said one or more processors based on results of said detecting, a context of said updates, said determining the context further based on content associated with data and the second software code, a location or directory associated with the data and the second software code, and network communication attributes associated with the data and the second software code;

determining, by said one or more processors based on said context, that said updates should be cloned and the cloned updates should be applied to said second software code;

determining, by said one or more processors based on said context, users requiring access to said updates;

determining, by said one or more processors, a target component location associated with said updates, said determining the target location based on network security and communication attributes associated with the network locations;

cloning, by said one or more processors via execution of said first software code, said updates to said second software code within a cloud for access and applying said cloned updates to said second software code with respect to said target component location to generate an updated second software code; and transmitting, by said one or more processors to said users, a notification indicating said cloning.

* * * * *